United States Patent [19]
Betts et al.

[11] Patent Number: 4,677,624
[45] Date of Patent: Jun. 30, 1987

[54] SELF-SYNCHRONIZING DE-INTERLEAVER FOR VITERBI DECODER USED IN WIRELINE MODEMS

[75] Inventors: William L. Betts, St. Petersburg; Kenneth Martinez, Pinellas Park, both of Fla.

[73] Assignee: Paradyne Corporation, Largo, Fla.

[21] Appl. No.: 707,083

[22] Filed: Mar. 1, 1985

[51] Int. Cl.$^4$ .................. G06F 11/10; H03M 13/22
[52] U.S. Cl. .......................... 371/43; 340/347 DD; 371/2; 375/26; 375/39
[58] Field of Search .............. 375/67, 25, 26, 34, 375/39; 340/347 DD; 360/39–42; 371/2, 43

[56] References Cited
U.S. PATENT DOCUMENTS
4,077,021  2/1978  Csajka et al. ............... 375/67 X Primary Examiner—T. J. Sloyan
Attorney, Agent, or Firm—Kane, Dalsimer, Sullivan, Kurucz

[57] ABSTRACT

In the transmitter of a data communication system using QAM, a plurality of trellis coders with delay units are used for forward error correction. The output of each encoder is modulated using QAM to generate sequential baud signal elements. The redundant data bits generated are distributed among several non-consecutive bauds. At the receiver a distributed convolutional decoder individually addressed having sectioned memory elements is utilized to decode the received signal element. The distributed trellis decoder is self-synchronizing.

3 Claims, 3 Drawing Figures

SELF-SYNCHRONIZING DE-INTERLEAVER FOR VITERBI DECODER USED IN WIRELINE MODEMS

RELATED APPLICATIONS

The subject matter of this application is related to U.S. applications Ser. No. 707,084 entitled Distributed Trellis Encoder, and Ser. No. 707,085 entitled Self-Synchronizing Interleaver for Viterbi Decoder Used in Wireline Modems, filed on even date herewith and incorporated herein by reference.

BACKGROUND OF THE INVENTION

1. Field of Invention

This invention pertains to an apparatus and method of encoding binary bits and more particularly to a method and apparatus for making use of a forward error correction scheme for a reduced number of errors at a given signal-to-noise ratio.

2. Description of the Prior Art

Communication networks using high speed data rates require high signal-to-noise ratios for proper data transmission. Numerous schemes and combinations thereof have been proposed to reduce the number of errors at these given signal-to-noise ratios. For example, in U.S. Pat. No. 4,077,021 to Csajka et al a forward error correcting scheme is described making use of the so-called Viterbi algorithm. In a further development described by the CCITT study group XVII, Contribution No. D180, in October, 1983, entitled TRELLIS-CODED MODULATION SCHEME WITH 8-STATE SYSTEMATIC ENCODER AND 90 SYMMETRY FOR USE IN DATA MODEMS TRANSMITTING 3-7 BITS PER MODULATION INTERVAL a two-dimensional trellis for a quadrature amplitude modulation scheme is disclosed having 90° symmetry which results in a 4 db gain in the signal-to-noise ratio. Typically, in forward error coding, redundant bits are added systematically to the data bits so that normally only predetermined transitions from one sequential group of bits (corresponding to bauds) to another are allowed. There is an inherent correlation between these redundant bits over consecutive bauds. At the receiver each baud is tentatively decoded and then analyzed based on past history, and the decoded bits are corrected if necessary. However, it was found that certain types of relatively long error signals, such as for example, low frequency phase jitter, cause a constant phase error in the signal constellation for extended (consecutive baud) periods of time. This type of error prevents or inhibits the correction of the received bits using the schemes described above.

OBJECTIVES AND SUMMARY OF THE INVENTION

A principal objective of the present invention is to provide a device and method for data communication in which the effects of long bursts of error signals such as low frequency phase jitter are minimized.

A further objective is to provide a method of adapting a standard modem to perform the subject method and to provide a method that is self-synchronizing.

Other objectives and advantages of the invention shall become apparent from the following description of the invention.

In the present invention the correlation of the redundant bits of different baud signals is distributed in time prior to encoding at the transmitter. A distributed trellis encoding scheme is used to obtain the redundant bits. At the receiver the received bauds are decoded using a plurality of distributed decoders which extract samples from multiple bauds for trellis decoding. The result is similar to that achieved by interleaving but avoids synchronization problems associated with the conventional complex interleaving processes.

DETAILED DESCRIPTION OF THE INVENTION

Figure 1:
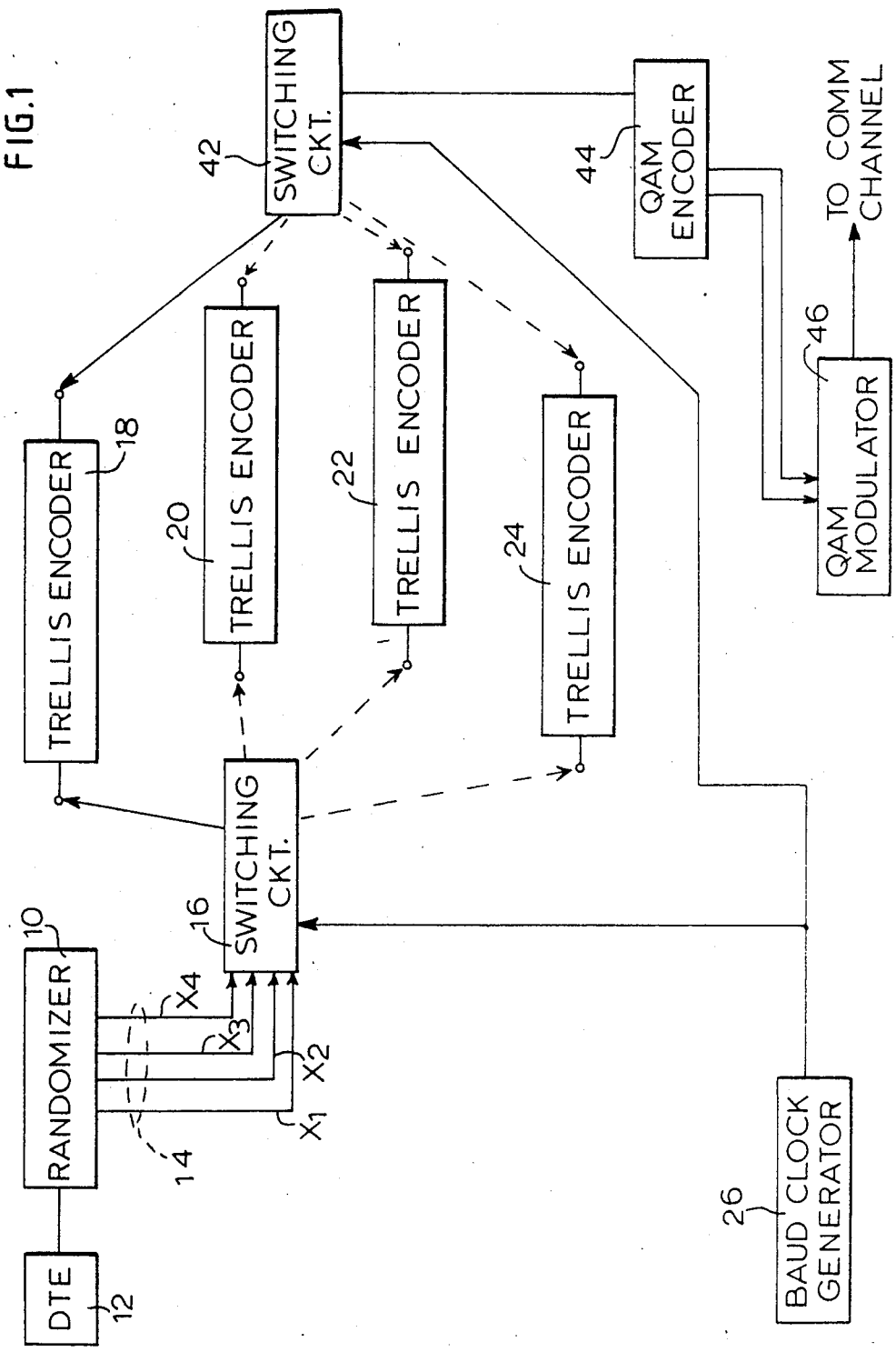
FIG. 1 shows the elements of a data transmitter constructed in accordance with the invention.

As shown in FIG. 1, a transmitter according to this invention comprises a randomizer 10 which receives serially a stream of data bits from DTE 12. The randomizer scrambles the bits in a preselected pattern and generates randomized bits on parallel output lines 14 identified as X1, X2, X3 and X4.

These output lines are fed by an electronic switching circuit 16 to a plurality of identical trellis encoders 18, 20, 22 and 24.

The electronic switching circuit 16 switches the signals from the randomizer 10 to one of the trellis encoders 18, 20, 22 and 24, in accordance with a baud clock signal generated by baud clock generator 26. In other words, for each baud period all the randomizer outputs X1, X2, X3 and X4 are fed to one of the encoders. Details of the trellis encoders 18, 20, 22 and 24 are shown in FIG. 2.

Each encoder comprises three delay units 28, 30 and 32 which are adapted to generate a delay of one baud period. The encoder further comprises three gates 34, 36 and 38. These gates may be for example XOR (exclusive -OR) gates.

Figure 2:
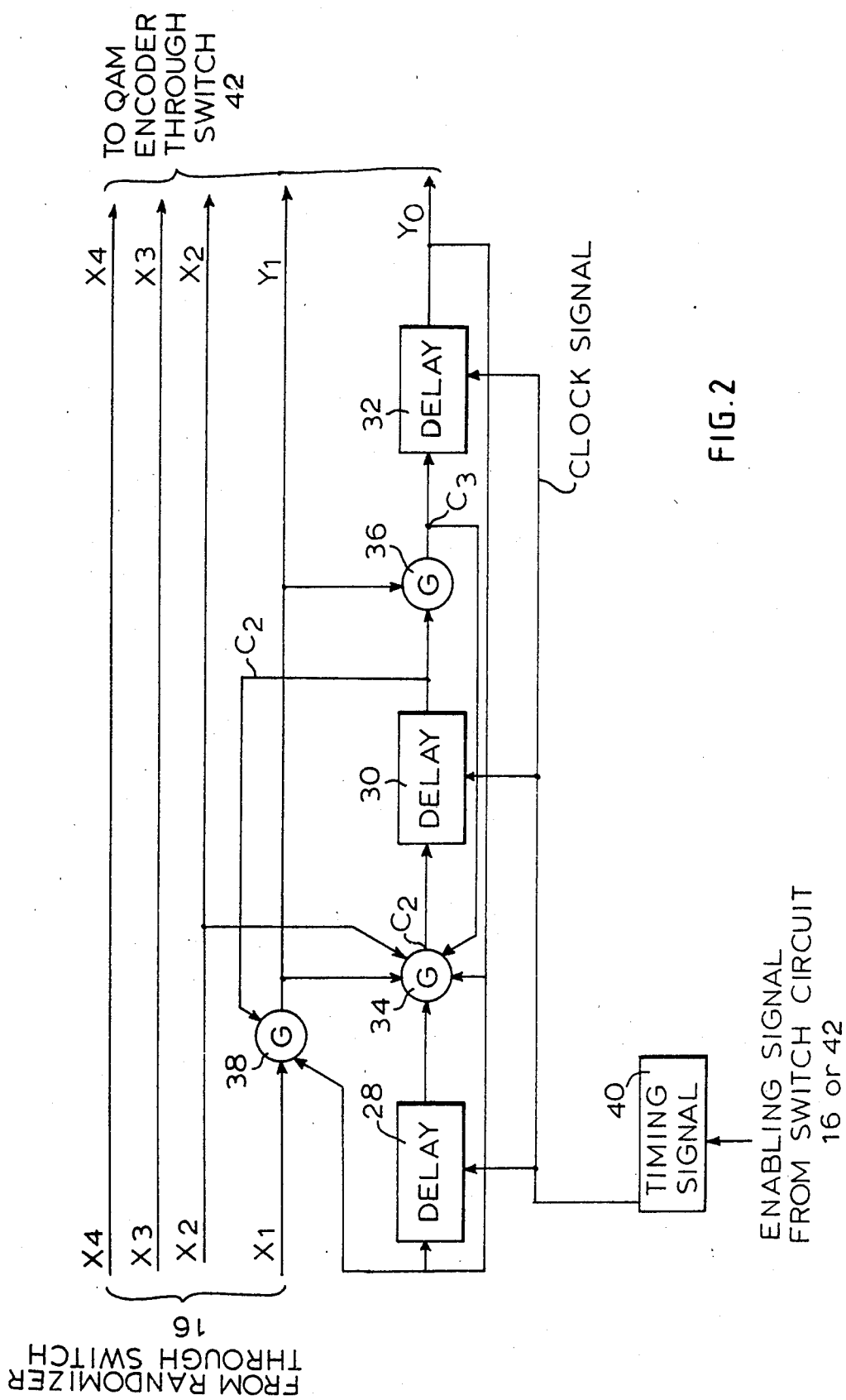
FIG. 2 shows the elements of a receiver for receiving data from the transmitter of FIG. 1.

The trellis encoder shown in FIG. 2 is well known in the art and need not be described any further. Preferably all the elements of the encoder are digital elements which are enabled by appropriate clocking signals from timing signal generator 40. The timing signal generator is enabled only when it receives an appropriate signal from switching circuit 16. Thus each encoder is active only when it is addressed by switching circuit 16. At all other times, the trellis encoders are idle.

Outputs Y0, Y1, X2, X3 and X4 are fed from the respective trellis encoders by a second electronic switching circuit 42 to QAM (quadrature amplitude modulation) encoder 44. Switching circuit 42 is also enabled by baud clock generator 26 so that it operates simultaneously with switching circuit 16. QAM encoder 44 selects a point of a preselected signal constellation corresponding to the inputs from circuit 42 and generates an in-phase and a quadrature output signal corresponding to said point. These output signals are fed to a QAM modulator 46 which generates corresponding analog QAM signals having a baud period equal to the period of the signals generated by signal generator 26. The signals from modulator 46 are transmitted over a common data communication channel to a receiver.

In effect the bits of several consecutive signals are spaced out over several bauds by the distributed trellis encoders.

Figure 3:
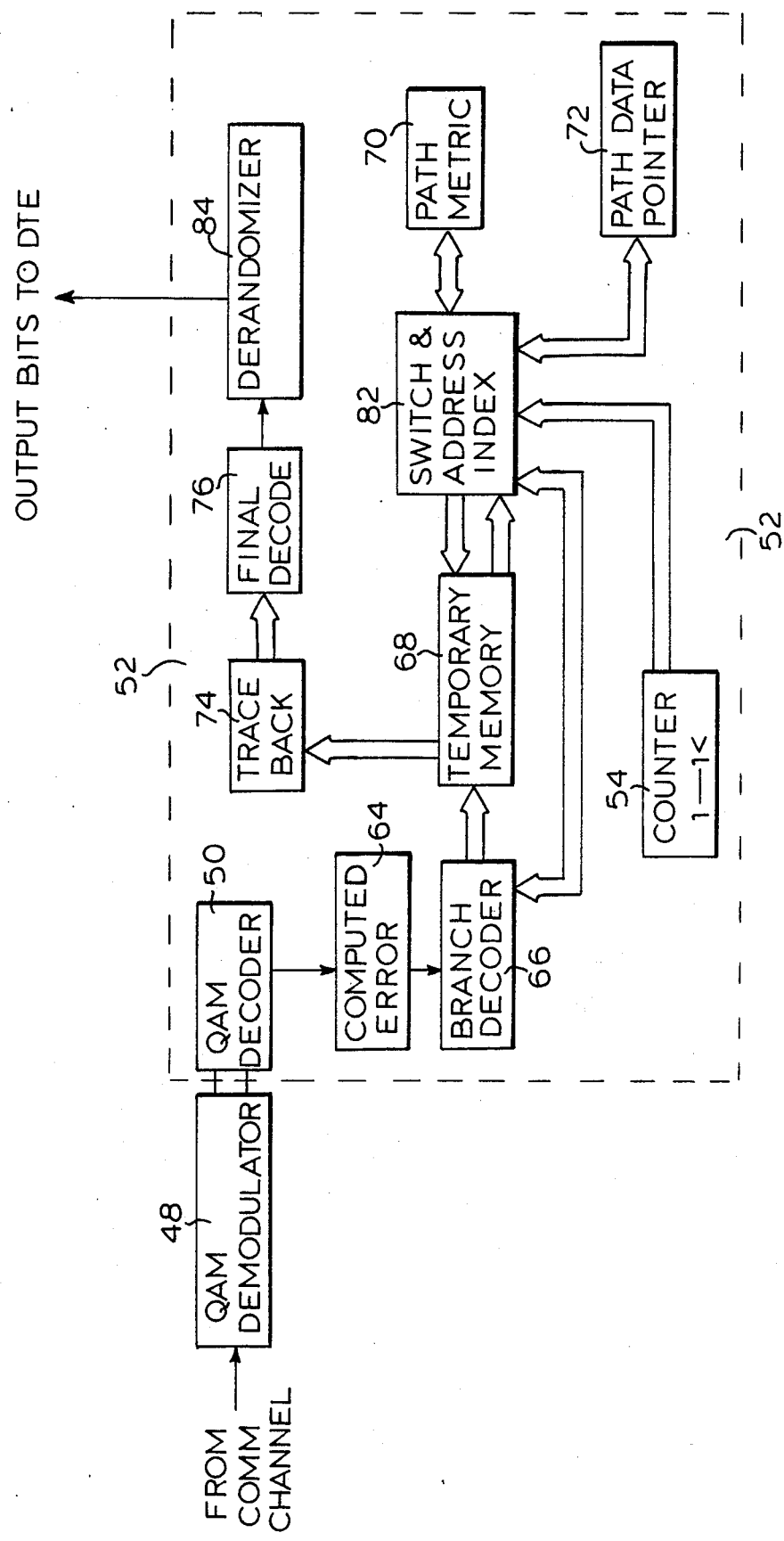
FIG. 3 shows the elements of a distributed trellis decoder.

At the receiver, illustrated in FIG. 3, the incoming analog signals are demodulated by a QAM demodulator 48 which generates an in-phase and a quadrature signal which are fed to a QAM decoder 50. The QAM decoder 50 selects a point on the signal constellation closest to the actual point corresponding to the signals received from QAM demodulator 48. The bits corresponding to said point are sent to a trellis decoder 52.

As in most trellis decoders, the signals from the QAM decoder are fed into an error computer circuit 64 which generates an error signal based on previously received signals. This error signal is fed to a branch decoder 66. The branch decoder uses the trellis branch rules (predetermined in accordance with the Viterbi algorithm) to generate a set of possible points corresponding to the received point. These sets of points are stored in temporary memory 68. The decoder then searches through the points of the set to calculate the point with the smallest errors in accordance with appropriate constants stored in the path metric memory 70 and path pointer memory 72. The smallest error is used by trace back memory 74 to track back the last 4-16 bauds (in accordance with a preselected well-known scheme) to generate the final received point. The final received point of the set of points in memory 68 is fed to final decoder 76 as the received point.

However, in the present system, the bits from the receiver of FIG. 1 are distributed over k bauds. In order to compensate for this effect, the temporary memory 68, path metric memory 70 and path data pointer memory 72 are partitioned into k sections. Furthermore, a ring counter 54 is provided which effectively counts from 1 to k, each count period being equal to the baud period of signals received by QAM demodulator 48. The count from counter 54 is provided to a switch and address index circuit 82, which in response enables one of the sections of memories 68, 70 and 72 by generating an appropriate address signal and sequentially transmits the contents of the appropriate sections of the path metric memory 70 and path data pointer memory 72 to temporary memory 68 as required. As a result, trellis decoder 52 consequently decodes and de-interleaves the data bits. In effect, by sequentially enabling the different sections of memory elements 68, 70 and 72, the decoder takes the place of separate trellis decoders.

It can be seen from the above description that switching circuits 16 and 42 act as multiplexers while decoder 52 acts as a demultiplexer. The effect of this switching is to interleave the data bits at the transmitter across four bauds, and deinterleave these bits at the receiver. Obviously the trellis encoders are self-synchronized so that no synchronizing signals are needed between the transmitter and receiver In the above description consecutive bits are interleaved across four bauds by using four distributed trellis encoders and the decoder. Obviously if more encoders and decoders are used k is increased to the number of bauds over which interleaving occurs increases.

It should be appreciated that the invention makes use of standard QAM encoders, modulators, decoders, demodulators and standard trellis encoders and decoders which are well known in the art. Furthermore, while baud clock generator is described as a separate element, in practice it can be incorporated in the QAM modulator. All the circuits of FIGS. 1 and 2 may be implemented by using a digital microprocessor.

Obviously, numerous modifications to the subject application may be made without departing from the scope of the invention as defined in the appended claims.

What is claimed is:

1. A receiver for receiving trellis encoded signals with baud periods, bits corresponding to a first baud period being interleaved with bits corresponding to subsequent k baud periods, k being larger than 2, comprising:
   a. demodulating means for converting the received signals into demodulated signals, said received signals having been generated by a circuit comprising a plurality of trellis encoders, each trellis encoder having an input for receiving a certain number of plain text bits in a single baud period, each trellis encoder having means for delaying at least some of said plain text bits so that they can be outputted and combined with bits outputted from one or more other trellis encoders during single baus periods;
   b. decoder means for decoding said demodulated signals into binary signals; and
   c. a trellis decoder for decoding said binary signals including:
      (1) a branch decoder for generating a set of possible points based on a group of said binary signals;
      (2) a temporary memory for storing said set of possible points;
      (3) path metric and path pointer memory means for storing constants;
      (4) a trace back memory to trace a trellis path;
      (5) a final decoder for generating plain text bits based on said set of points, said constant and said trellis path; and
      (6) said temporary, path metric, and path data pointer memories being partitioned into k memory sections, each corresponding memory section being activated simultaneously.

2. The decoder of claim 4 further comprising a switch and index address circuit for sequentially addressing the corresponding sections of said memories.

3. The decoder of claim 2 further comprising a ring counter means for enabling said switch and index address circuit in accordance with the baud period of said received signals.

* * * * *